United States Patent
Sarkis et al.

(10) Patent No.: US 12,004,125 B2
(45) Date of Patent: Jun. 4, 2024

(54) TECHNIQUES FOR NETWORK CODING INITIATION FOR SIDELINK

(71) Applicant: QUALCOMM Incorporated, San Diego, CA (US)

(72) Inventors: Gabi Sarkis, San Diego, CA (US); Guangyi Liu, San Diego, CA (US); Tien Viet Nguyen, Bridgewater, NJ (US); Karthika Paladugu, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/455,361

(22) Filed: Nov. 17, 2021

(65) Prior Publication Data

US 2023/0156671 A1    May 18, 2023

(51) Int. Cl.
*H04W 72/04* (2023.01)

(52) U.S. Cl.
CPC .................................. *H04W 72/04* (2013.01)

(58) Field of Classification Search
CPC ..... H04W 72/04; H04W 64/00; G01S 5/0226; G01S 5/14; G01S 19/06; G01S 19/252
See application file for complete search history.

(56) References Cited

U.S. PATENT DOCUMENTS

| 2013/0229968 A1* | 9/2013 | Zainaldin | H04L 1/1896 370/312 |
| 2018/0359050 A1* | 12/2018 | Lauridsen | H04L 1/0009 |
| 2019/0261302 A1* | 8/2019 | Johansson | G01S 5/14 |
| 2022/0179097 A1* | 6/2022 | Gunnarsson | H04W 64/00 |

OTHER PUBLICATIONS

WO 2018084773 A1 (Year: 2018).*
J. Huang, H. Gharavi, H. Yan and C.-C. Xing, "Network Coding in Relay-Based Device-to-Device Communications," in IEEE Network, vol. 31, No. 4, pp. 102-107, Jul.-Aug. 2017, doi: 10.1109/MNET.2017.1700063. (Year: 2017).*

* cited by examiner

*Primary Examiner* — Rushil P. Sampat
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may obtain an indication that a network node is configured to accept a request for the network node to perform network coding for a communication from the UE. The UE may transmit, based at least in part on the UE being within an area associated with the network node, the request for the network node to perform the network coding for the communication. Numerous other aspects are described.

30 Claims, 11 Drawing Sheets

TECHNIQUES FOR NETWORK CODING INITIATION FOR SIDELINK

FIELD OF THE DISCLOSURE

Aspects of the present disclosure generally relate to wireless communication and to techniques and apparatuses for network coding initiation for sidelink.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining an indication that a network node is configured to accept a request for the network node to perform network coding for a communication from the UE. The method may include transmitting, based at least in part on the UE being within an area associated with the network node, the request for the network node to perform the network coding for the communication.

Some aspects described herein relate to a method of wireless communication performed by a network node. The method may include receiving, from a UE, a request for the network node to perform network coding for a communication from the UE. The method may include transmitting, to the UE, based at least in part on the UE being within an area associated with the network node, an indication that the network node will perform the network coding for the communication.

Some aspects described herein relate to an apparatus for wireless communication performed by a UE. The apparatus may include a memory and one or more processors, coupled to the memory. The one or more processors may be configured to receive, from a UE, a request for the network node to perform network coding for a communication from the UE. The one or more processors may be configured to transmit, based at least in part on the UE being within an area associated with the network node, the request for the network node to perform the network coding for the communication.

Some aspects described herein relate to an apparatus for wireless communication performed by a base station. The apparatus may include a memory and one or more processors, coupled to the memory. The one or more processors may be configured to receive, from a UE, a request for the network node to perform network coding for a communication from the UE. The one or more processors may be configured to transmit, to the UE, based at least in part on the UE being within an area associated with the network node, an indication that the network node will perform the network coding for the communication.

Some aspects described herein relate to a non-transitory computer-readable medium that stores a set of instructions for wireless communication by a UE. The set of instructions, when executed by one or more processors of the UE, may cause the UE to obtain an indication that a network node is configured to accept a request for the network node to perform network coding for a communication from the UE. The set of instructions, when executed by one or more processors of the UE, may cause the UE to transmit, based at least in part on the UE being within an area associated with the network node, the request for the network node to perform the network coding for the communication.

Some aspects described herein relate to a non-transitory computer-readable medium that stores a set of instructions for wireless communication by a network node. The set of instructions, when executed by one or more processors of the network node, may cause the network node to receive, from a UE, a request for the network node to perform network coding for a communication from the UE. The set of instructions, when executed by one or more processors of the network node, may cause the network node to transmit, to the UE, based at least in part on the UE being within an area associated with the network node, an indication that the network node will perform the network coding for the communication.

Some aspects described herein relate to an apparatus for wireless communication. The apparatus may include means for obtaining an indication that a network node is configured to accept a request for the network node to perform network coding for a communication from the apparatus. The apparatus may include means for transmitting, based at least in part on the apparatus being within an area associated with the network node, the request for the network node to perform the network coding for the communication.

Some aspects described herein relate to an apparatus for wireless communication. The apparatus may include means for receiving, from a UE, a request for the apparatus to perform network coding for a communication from the UE. The apparatus may include means for transmitting, to the UE, based at least in part on the UE being within an area associated with the apparatus, an indication that the apparatus will perform the network coding for the communication.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
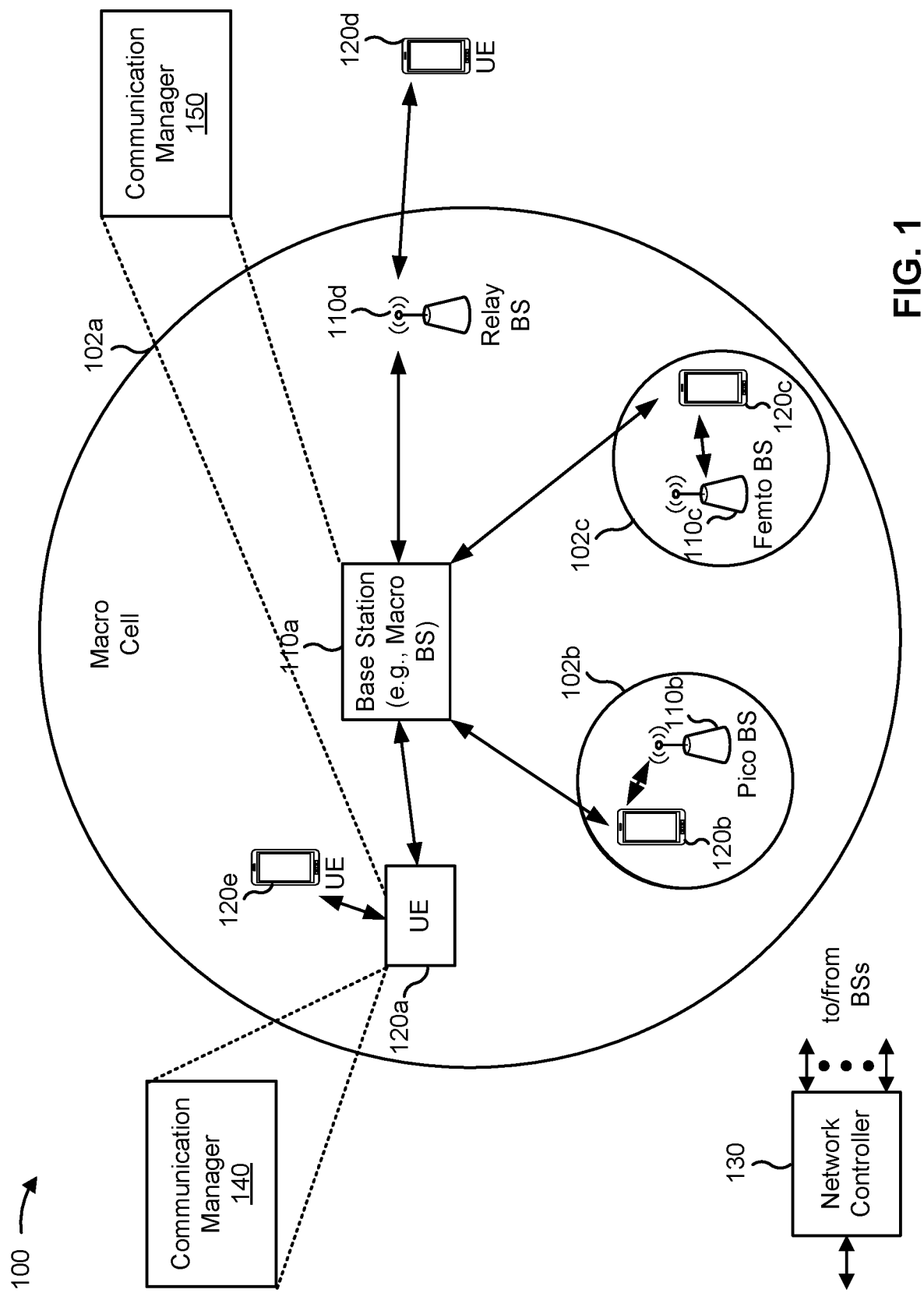
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), one or more network nodes, and/or other network entities. A network node may be a UE (e.g., a roadside unit or a vehicle), such as the UE 120, or may be a base station, such as the base station 110. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain an indication that a network node is configured to accept a request for the network node to perform network coding for a communication from the UE; and transmit, based at least in part on the UE being within an area associated with the network node, the request for the network node to perform the network coding for the communication. Additionally, or alternatively, the communication manager 140 may perform one or more other operations described herein.

In some aspects, the network node may include a communication manager 150. The network node may be the base station 110 or the UE 120, or may include one or more components of the base station 110 or the UE 120. As described in more detail elsewhere herein, the communication manager 150 may receive, from a UE, a request for the network node to perform network coding for a communication from the UE; and transmit, to the UE, based at least in part on the UE being within an area associated with the network node, an indication that the network node will perform the network coding for the communication. Additionally, or alternatively, the communication manager 150 may perform one or more other operations described herein.

As indicated above, FIG. 1 is provided as an example. Other examples may differ from what is described with regard to FIG. 1.

Figure 2:
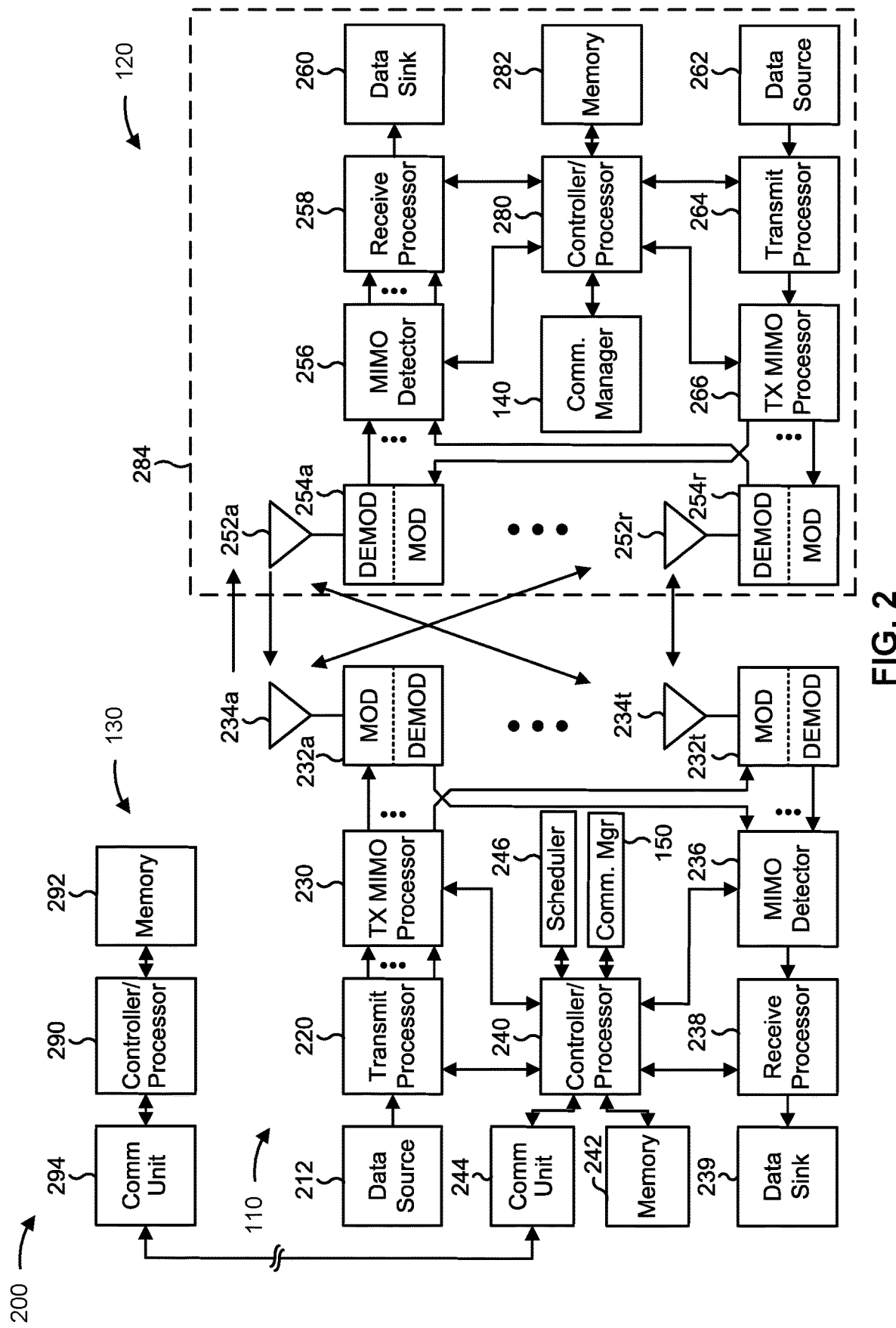
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with network coding initiation for sidelink, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for obtaining an indication that a network node is configured to accept a request for the network node to perform network coding for a communication from the UE; and/or means for transmitting, based at least in part on the UE being within an area associated with the network node, the request for the network node to perform the network coding for the communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving, from a UE, a request for the network node to perform network coding for a communication from the UE; and/or means for transmitting, to the UE, based at least in part on the UE being within an area associated with the network node, an indication that the network node will perform the network coding for the communication. In some aspects (e.g., when the network node is a base station 110), the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects (e.g., when the network node is a UE 120), the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
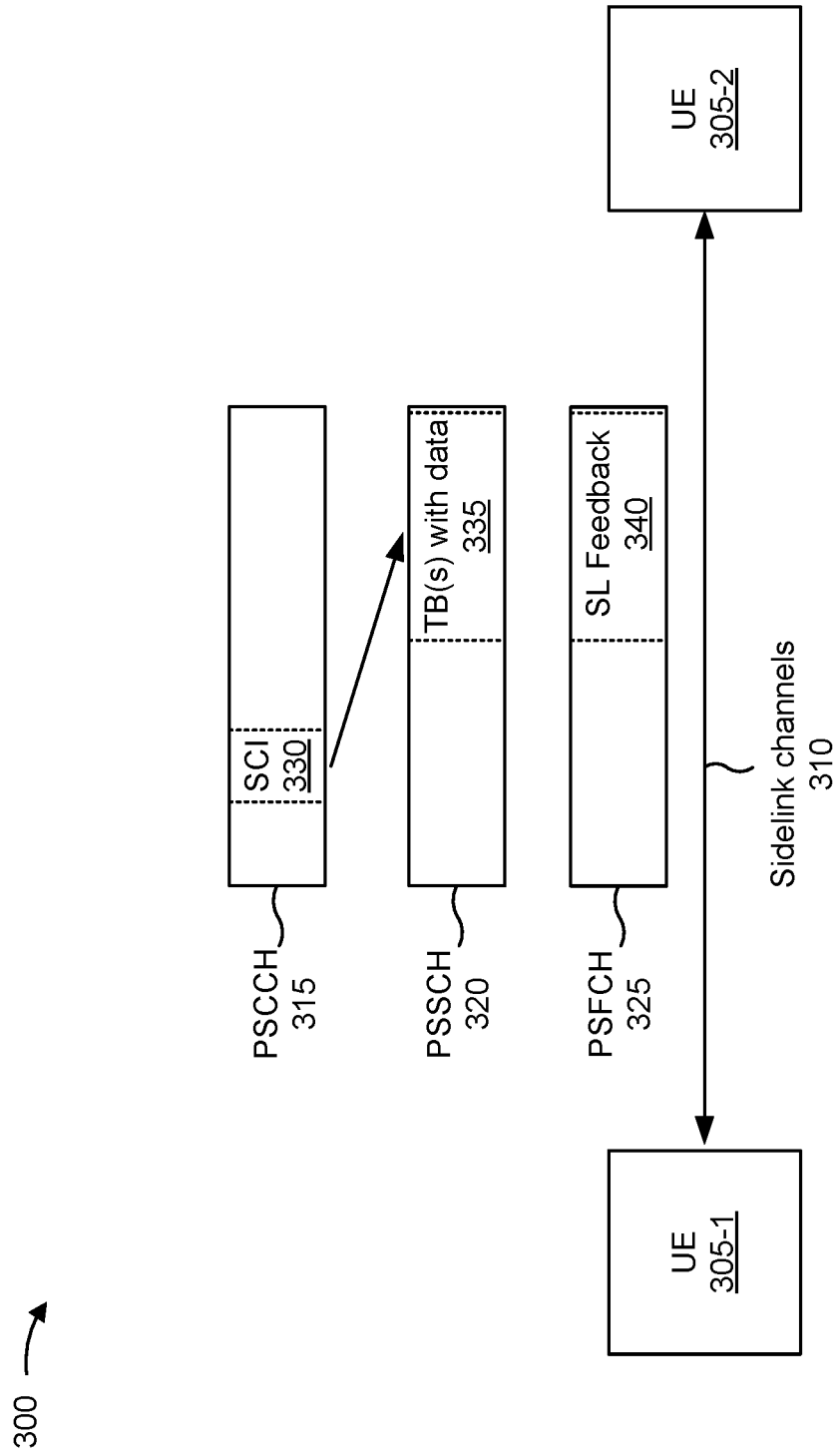
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, a sidelink communication may need to be retransmitted. For example, the sidelink communication may become corrupted as a result of an erasure during a transmission of the sidelink communication. The UE 305 may be configured to retransmit the communication using network coding.

As indicated above, FIG. 3 is provided as an example. Other examples may differ from what is described with respect to FIG. 3.

Figure 4:
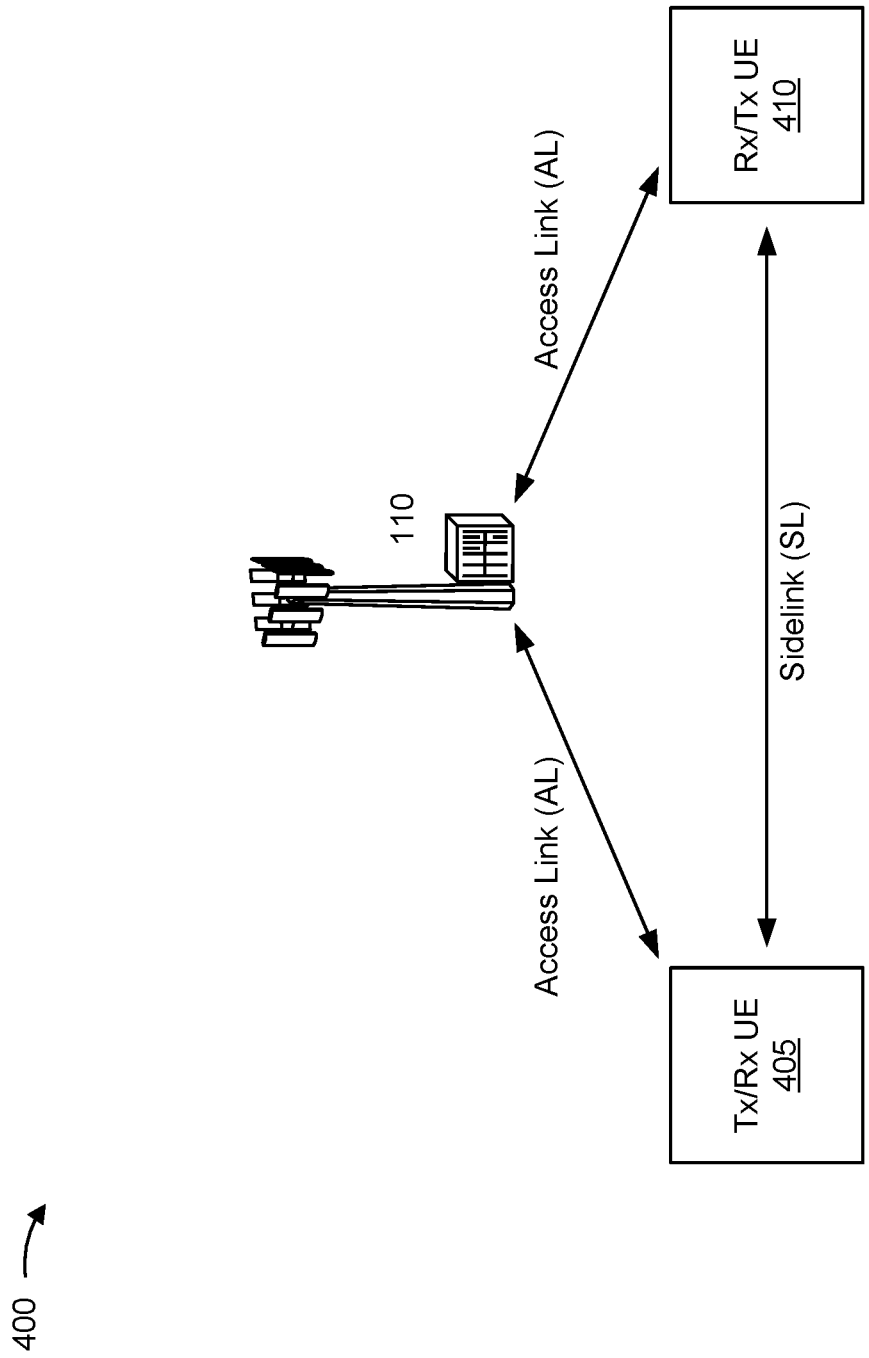
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, a sidelink communication may need to be retransmitted. For example, the sidelink communication may become corrupted as a result of an erasure during a transmission of the sidelink communication. The communication may be retransmitted by a network node using network coding, such as by a base station (e.g., the base station 110) or a UE (e.g., the UE 405 or the UE 410).

As indicated above, FIG. 4 is provided as an example. Other examples may differ from what is described with respect to FIG. 4.

Figure 5:
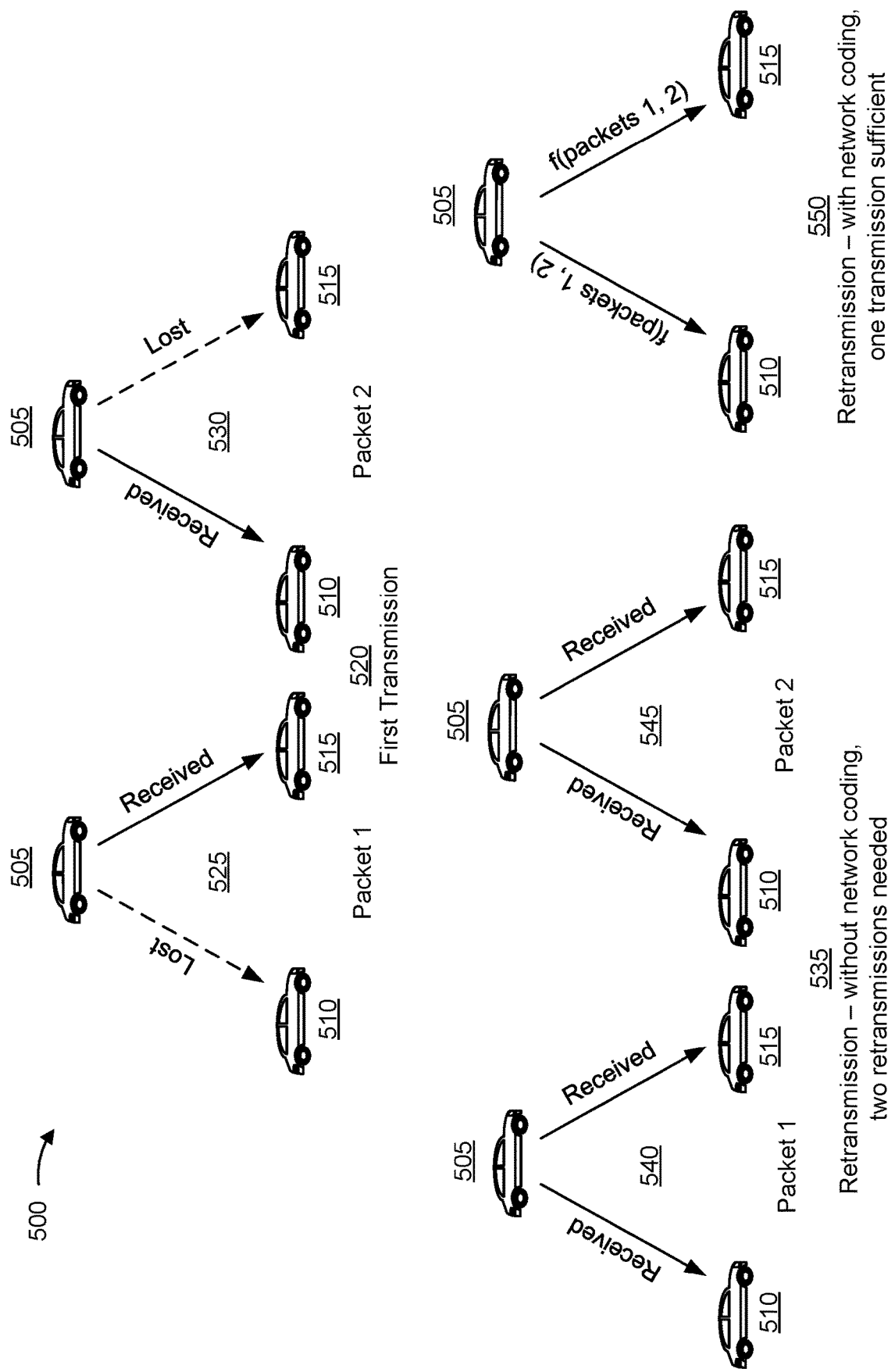
FIG. 5 is a diagram illustrating an example of network coding, in accordance with the present disclosure.

FIG. 5 is a diagram illustrating an example 500 of network coding.

As shown in FIG. 5, a UE, such as a transmitting UE 505, may transmit communications to one or more receiving UEs, and may be associated with a roadside unit, a network node, and/or a base station, among other examples. For example, the transmitting UE 505 may transmit one or more communications to a first receiving UE 510 associated with a first receiving vehicle and a second receiving UE 515 associated with a second receiving vehicle. In some aspects, the transmitting UE 505 may relay one or more communications received from an originating UE (not shown) to the first receiving UE 510 and to the second receiving UE 515. The UE 510 and/or the UE 515 may correspond to one or more UEs described elsewhere herein, such as the UE 120 and/or the UE 305.

As shown by reference number 520, in a first transmission, the transmitting UE 505 may transmit a first communication and a second communication to a first receiving UE 510 associated with a first receiving vehicle and to a second receiving UE 515 associated with a second receiving vehicle. In some aspects, the communications may be P2P communications, such as sidelink communications. Additionally, or alternatively, the communications may include packets. For example, the first communication may be a P2P communication that includes a first packet (e.g., "Packet 1") and the second communication may be a second P2P communication that includes a second packet (e.g., "Packet 2"). However, the communications are not limited to P2P communications, and are not limited to including packets, and may be any type of communication. As shown by reference number 525, the first receiving UE 510 may fail to receive the first communication, and the second receiving UE 515 may receive the first communication. As shown by reference number 530, the first receiving UE 510 may receive the second communication, and the second receiving UE 515 may fail to receive the second communication.

As shown by reference number 535, if the transmitting UE 505 does not use network coding, then the transmitting UE 505 may retransmit both the first communication and the second communication (e.g., for a total of two retransmissions). For example, as shown by reference number 540, the transmitting UE 505 may retransmit the first communication because the first receiving UE 510 previously failed to receive the first communication. Furthermore, as shown by reference number 545, the transmitting UE 505 may retransmit the second communication because the second receiving UE 515 previously failed to receive the second communication.

As described in more detail below, network coding may be used to combine communications, thereby reducing the number of required retransmissions. For example, an encoder associated with the transmitting UE 505 may encode data, such as a set of original packets (p1, p2, and p3), into a set of encoded packets using network coding. While this example uses "packets" as example data, it is understood that the data may include any type of communication (e.g., transport blocks), and is not limited to packets. An encoded packet may be the same as an original packet, may be a redundancy version of an original packet, may include a combination of multiple original packets (e.g., a subset of the original packets), and/or may include a redundancy version of the combination. The number of encoded packets may be the same as or different than the number of original packets. In some cases, the encoder encodes K original packets (where K=3) into N encoded packets (where N=4). The encoder transmits the encoded packets to a decoder (or receiver) associated with the transmitting UE 505. The decoder uses network coding to decode the encoded packets and recover the original packets.

In some cases, the encoder encodes three original packets (p1, p2, and p3) into four encoded packets (that carry p2, p1+p2, p1+p3, and p2+p3, respectively) and transmits the four encoded packets to the decoder. The packet carrying p1+p2 is not successfully received by the decoder. In a first operation 605, the decoder decodes the packet carrying p2. In a second operation 610, the decoder obtains p3 from the packet containing p2+p3 because the decoder has already decoded p2 and can use combining to obtain p3 from p2+p3. In a third operation 615, the decoder obtains p1 from the packet containing p1+p3 because the decoder has already decoded p3 and can use combining to obtain p1 from p1+p3.

In some aspects, an encoded packet may include an indication (e.g., in a header of the encoded packet) that indicates the original packet(s) that are included in the encoded packet.

In some cases, the encoder may continue to transmit encoded packets (e.g., the same combination of encoded packets or different combinations of encoded packets) to the decoder until the encoder receives a notification from the decoder. For example, the decoder may successfully receive the original packets or may abort decoding, which may trigger the decoder to send a notification to the encoder. The notification may include, for example, an acknowledgement (ACK) and/or a stop message (STOP). In some aspects, the decoder may transmit an ACK for each original packet that is successfully received. Additionally, or alternatively, the decoder may transmit an ACK upon successful reception of all of the original packets. Upon receiving the notification, the encoder may encode additional data (e.g., a new set of original packets, such as p4, p5, and p6), and may transmit encoded packets to the decoder, in a similar manner as described above, until all of the data has been transmitted and/or successfully received.

In some cases, the encoder may perform inner coding to generate redundant packets from the original packets. A redundant packet may be a copy of an original packet or a redundancy version of an original packet. For example, the encoder may apply inner coding to generate K' original plus redundant packets from K original packets. The encoder may then perform outer coding to generate N encoded packets from the K' original plus redundant packets, in a similar manner as described above.

In some cases, the network coding may be viewed as a linear system (e.g., over a Galois field) with three variables and four linearly independent constraints. For example, the three variables may correspond to the original packets (e.g., p1, p2, and p3) and the four linearly independent constraints may correspond to the four encoded packets (e.g., the four encoded packets that carry p2, p1+p2, p1+p3, and p2+p3). Using the linear system, any of the three variables that have been subject to an erasure (e.g., transmission error) may be recovered based at least in part on a portion of the three original packets and based at least in part on a portion of the four encoded packets. An example representation of the linear system is shown below:

$$\begin{bmatrix} 1 & 0 & 0 \\ 0 & 1 & 0 \\ 0 & 0 & 1 \\ 1 & 1 & 1 \end{bmatrix} \cdot [a \; b \; c]^T = [a \; b \; c \; a \oplus b \oplus c]^T$$

where a, b, and c correspond to the three original packets, and T represents a transpose of the function. Combining communications using one or more of the network coding examples described above may provide advantages associated with retransmission without increasing network load or interference.

As described above, if the transmitting UE 505 does not use network coding, then the transmitting UE 505 may need to retransmit both the first communication and the second communication (e.g., for a total of two retransmissions). In contrast, network coding may be used to combine communications, thereby reducing the number of required retransmissions. As shown by reference number 550, if the transmitting UE 505 uses network coding to combine the communications, then the transmitting UE 505 may only need to retransmit a single communication. In some aspects, the single communication may be a combined communication that includes both the first communication and the second communication. For example, the transmitting UE 505 may combine the first communication and the second communication using an exclusive or (XOR) operation, and may transmit the combined communication to the first receiving UE 510 and the second receiving UE 515.

In some cases, network coding may reduce an overall load on the network. For example, a network node (e.g., the transmitting UE 505) using network coding may only need to perform a single retransmission of a combined communication, rather than perform two separate transmissions of the individual communications. However, the network node may only be able to perform a certain number of network coding retransmissions. A network node that accepts network coding requests from any UE (e.g., regardless of a location of the UE) may not have enough resources to perform network coding and retransmissions for all of the requesting UEs. This may be particularly true when the network coding requests are for sidelink communications or retransmissions (e.g., due to less resources being allocated for sidelink communications as compared to non-sidelink communications). In some cases, the network node may not be able to determine whether it should accept, or reject, a request from a particular UE to perform network coding for a communication. Additionally, the UE requesting the network coding may not be able to determine whether the network node can accept the request for the network coding prior to transmitting the request for the network coding. Thus, the resources of the network node may be overwhelmed by the number of network coding requests received by the network node.

Techniques and apparatuses are described herein for determining whether a network node can perform network coding for a communication received from a UE. For example, the UE and/or the network node may be configured to determine whether the network node can accept a request for the network node to perform network coding for a communication based at least in part on an area associated with the network node and a location of the UE. In some aspects, the UE may obtain an indication of the area associated with the network node (e.g., an area for which the network node will accept network coding requests), and may transmit the request for the network node to perform the network coding for the communication based at least in part on the UE being within the area associated with the network node.

In some aspects, enabling the UE and the network node to determine whether the network node can accept network coding requests from the UE may reduce network congestion. For example, the network node may only be able to perform network coding for a number of communications at a time. As described above, this is particularly true when the network coding requests are for sidelink communications or retransmissions. Using the techniques and apparatuses described herein, the UE may only transmit, and the network node may only accept, requests for network coding when the UE is within a location that is defined by an area of the network node. Thus, the number of network coding requests, and therefore, the number of resources (e.g., sidelink resources) of the network node needed to perform the network coding, may be reduced.

As indicated above, FIG. 5 is provided as an example. Other examples may differ from what is described with respect to FIG. 5.

Figure 6:
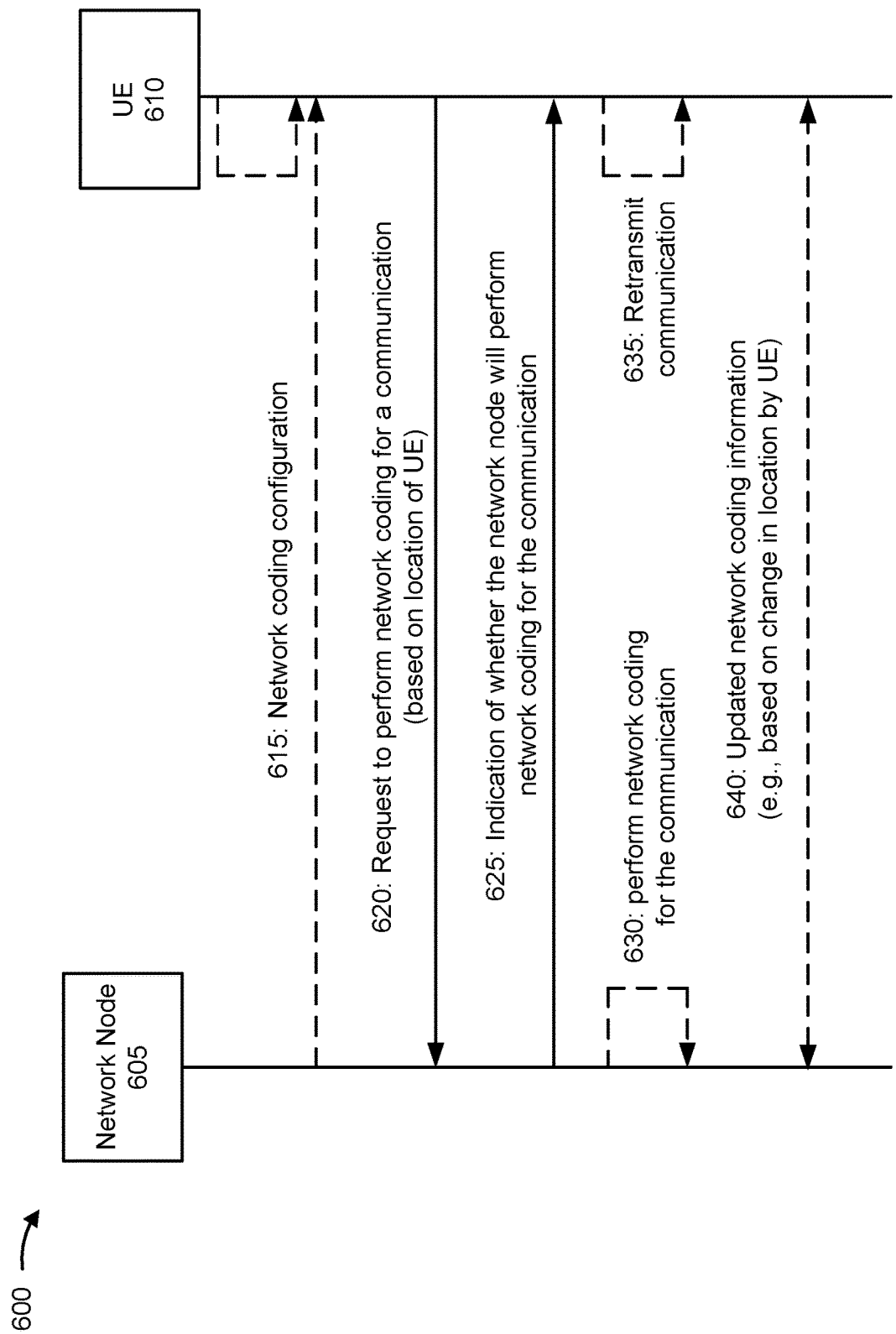
FIG. 6 is a diagram illustrating an example associated with network coding initiation for sidelink, in accordance with the present disclosure.

FIG. 6 is a diagram illustrating an example 600 of network coding initiation for sidelink. A network node, such as the network node 605, may communicate with a UE, such as the UE 610. The network node 605 may have some or all of the features of the network node 505. The UE 610 may have some or all of the features of the UE 120, the UE 510, and/or the UE 515. In some aspects, the network node 605 and the UE 610 may communicate using sidelink communications, non-sidelink communications, or a combination of sidelink communications and non-sidelink communications.

As shown in connection with reference number 615, the UE 610 may obtain network coding information. In some aspects, the network coding information may indicate a network node 605 that is configured to perform network coding for the UE 610. Additionally, or alternatively, the network coding information may indicate location information that enables the UE 610 to determine whether the network node 605 can perform network coding for a communication received from the UE 610. In some aspects, the location information may include an area associated with the network node 605. In some aspects, the network node 605 may be a stationary network node, a mobile network node, or a combination of a stationary network node and a mobile network node. Additional details regarding the area associated with the network node 605 are described in connection with FIG. 7.

In some aspects, the UE 610 may obtain the network coding information based at least in part on a configuration of the UE 610. The UE 610 may be configured (e.g., pre-configured) with information that allows the UE 610 to determine whether one or more network nodes 605 can accept network coding requests from the UE 610. For example, the UE 610 may be configured with information that indicates an area associated with the network node 605. The network node 605 may only be able to perform network coding for network coding requests that are transmitted (e.g., by the UE 610) from within the area associated with the network node 605.

In some aspects, the network node 605 may transmit the network coding information to the UE 610. For example, the network node 605 may transmit, and the UE 610 may receive, an indication of the area associated with the network node 605. The indication of the area associated with the network node 605 may be transmitted by the network node 605 using a sidelink communication (e.g., using second stage sidelink control information (SCI-2)), a medium access control (MAC) message (e.g., a MAC control element (CE)), or a radio resource control (RRC) message (e.g., using a PC5 interface), among other examples.

As shown in connection with reference number 620, the UE 610 may transmit, and the network node 605 may receive, a request to perform network coding for a communication. In some aspects, the UE 610 may transmit the request for the network node 605 to perform the network coding based at least in part on location information associated with the network node 605 and/or location information associated with the UE 610.

In some aspects, the UE 610 may obtain an indication of the area associated with the network node 605, and may determine whether the UE 610 is located in the area associated with the network node 605. The area associated with the network node 605 may be determined based at least in part on configuration information associated with the UE 610. Additionally, or alternatively, the indication of the area associated with the network node 605 may be received from the network node 605. The UE 610 may transmit the request for the network node 605 to perform the network coding for the communication based at least in part on the UE 610 determining that the UE 610 is within the area associated with the network node 605. Alternatively, the UE 610 may not transmit the request for the network node 605 to perform the network coding for the communication based at least in part on the UE 610 determining that the UE 610 is not within the area associated with the network node 605.

As shown in connection with reference number 625, the network node 605 may transmit, and the UE 610 may receive, an indication of whether the network node 605 will perform network coding for the communication. As described above, the UE 610 may determine that it is within the area associated with the network node 605 prior to transmitting the request for the network node 605 to perform the network coding for the communication. In some aspects, the network node 605 may be configured to determine (e.g., confirm) whether the UE 610 is within the area associated with the network node 605. For example, the network node 605 may receive the request from the UE 610 to perform network coding for the communication, and may determine to accept the request to perform the network coding if the UE 610 is within the area associated with the network node, or may determine to reject the request to perform the network coding if the UE 610 is outside of the area associated with the network node. Additionally, or alternatively, the network node 605 may determine whether the network node 605 can accept the request, or should accept the request, to perform the network coding for the communication based at least in part on one or more network coding conditions, such as the network coding conditions described below. By selectively accepting network coding requests based at least in part on the network coding conditions, the network node 605 can prevent communication resources (e.g., sidelink resources) from becoming overloaded.

In some aspects, the one or more network coding conditions may include a location of the network node, a location of the UE, a priority of the communication, a current load of a network associated with the network node, or a current load of the network node, among other examples. As described above, the network node 605 may be configured to determine whether the network node 605 can perform network coding for a communication received from the UE 610 based at least in part on a location of the network node 605 and a location of the UE 610. For example, the transmission of the communication from the UE 610 may include an indication of whether the UE 610 is within the area associated with the network node 605. Additionally, or alternatively, the transmission of the communication from the UE 610 may include an indication of the location of the UE 610, and the network node 605 may determine whether the UE 610 is within the area associated with the network node 605.

In some aspects, the network node 605 may determine whether to accept the network coding request based at least in part on a priority of the communication. For example, the network node 605 may determine, or the UE 610 may indicate, a priority associated with the communication for which network coding is requested. In some aspects, the priority may be indicated in a QoS value of the packet. If the network node 605 determines that the priority is greater than, or greater than or equal to, a priority threshold, the network node 605 may determine to accept the network coding request for the communication. In contrast, if the network node 605 determines that the priority is less than, or less than or equal to, the priority threshold, the network node 605 may determine to reject the network coding request for the communication. Thus, the network node 605 may ensure that communications having a higher priority are more likely to be retransmitted using network coding than communications having a lower priority.

In some aspects, the network node 605 may determine whether to accept the network coding request based at least in part on a load of the network associated with the network node 605. For example, the network node 605 may determine, or may be configured with, a network load threshold. If the network node 605 determines that the current network load is less than, or less than or equal to, the network load threshold, the network node 605 may determine to accept the network coding request. In contrast, if the network node 605 determines that the current network load is greater than, or greater than or equal to, the network load threshold, the network node 605 may determine to reject the network coding request. Thus, the network node 605 may ensure that communications are not retransmitted using network coding if the network is at risk of being overloaded.

In some aspects, the network node 605 may determine whether to accept the network coding request based at least in part on a current load of the network node 605. For example, the network node 605 may determine, or may be configured with, a network node threshold. If the network node 605 determines that the current load of the network node is less than, or less than or equal to, the network node threshold, the network node 605 may determine to accept the network coding request. In contrast, if the network node 606 determines that the current load of the network node is greater than, or greater than or equal to, the network node threshold, the network node 605 may determine to accept the network coding request. Thus, the network node 605 may ensure that communications are not retransmitted using network coding if the resources of the network node are at risk of being overloaded.

In some aspects, the network node 605 may determine whether to accept the network coding request based at least in part on a combination of the network coding conditions. For example, the network node 605 may determine whether to accept the network coding request based at least in part on a priority of the communication and a current load of the network. If the priority is greater, or greater than or equal to, the priority threshold, and the current load of the network is less than, or less than or equal to, the network load threshold, the network node 605 may determine to accept the network coding request. Otherwise, the network node 605 may determine to reject the network coding request. As indicated above, the network coding conditions described herein are exemplary only. Thus, other network coding conditions may be considered in addition to, in place of, the network coding conditions described herein.

As shown in connection with reference number 630, the network node 605 may perform the network coding for the communication. The network node 605 may determine to perform the network coding for the communication based at least in part on one or more of the network coding conditions described above. In some aspects, performing the network coding for the communication may include retransmitting the communication using network coding. In some aspects, the network node 605 may perform the network coding by combining the communication with one or more other communications (e.g., using an XOR operation) to create a combined communication, and transmitting the combined communication. As described above, retransmitting the communication using network coding may use less resources of the network, as well as less resources of the network node, compared to retransmitting the communication without network coding.

In some aspects, the network node 605 may transmit an indication to the UE 610 that the network node 605 will perform the network coding. The UE 610 may refrain from retransmitting the communication based at least in part on receiving the indication from the network node 605 that the network node 605 will perform the network coding for the communication.

As shown in connection with reference number 635, the UE 610 may retransmit the communication. In some aspects, the UE 610 may retransmit the communication based at least in part on the UE 610 being outside of the area associated with the network node 605. For example, the UE 610 may determine that the UE 610 is outside of the area associated with the network node 605. Additionally, or alternatively, the UE 610 may receive an indication from the network node 605 that the UE 610 is outside of the area associated with the network node 605. Thus, the UE 610 may retransmit the communication.

In some aspects, the network node 605 may transmit an indication to the UE 610 that the network node 605 will not perform the network coding for the communication. The UE 610 may retransmit the communication based at least in part on receiving the indication from the network node 605 that the network node will not perform the network coding for the communication.

In some aspects, the network node 605 may enable or disable the ability of the UE 610 to perform retransmissions of one or more communications. Additionally, or alternatively, a configuration of the UE may enable or disable the ability of the UE 610 to perform retransmissions of the one or more communications. For example, the network node 605, or the configuration of the UE 610, may indicate that the UE 610 may only perform retransmissions for certain types of communications (e.g., communications having a certain priority). In some aspects, the network node 605 may indicate a maximum number of retransmissions of the one or more communications by the UE 610. Additionally, or alternatively, a configuration of the UE 610 may indicate a maximum number of retransmissions of the one or more communications by the UE 610. The UE 610 may refrain from retransmitting the one or more communications based at least in part on determining that the maximum number of retransmissions by the UE 610 has been performed or exceeded. In some aspects, the network node 605 may indicate the ability of the UE 610 to perform retransmissions, or may indicate the maximum number of retransmissions by the UE 610, using a sidelink communication (e.g., using SCI-2, a MAC-CE, or an RRC message using the PC5 interface).

As shown in connection with reference number 640, the network node 605 may transmit or receive, and the UE 610 may transmit or receive, updated network coding information. The updated network coding information may indicate a change to whether or not the network node 605 will perform network coding for the communication.

In some aspects, the network coding information may be based at least in part on a change in location of the UE 610. For example, the UE 610 may determine that the UE 610 has moved outside of the area associated with the network node 605. The UE 610 may transmit an indication to the network node 605 indicating that the UE 610 has moved outside of the area associated with the network node 605. Additionally, or alternatively, the network node 605 may determine that the UE 610 has moved outside of the area associated with the network node 605. Thus, the network node 605 may no longer perform network coding for communications received from the UE 610 based at least in part on the change in location by the UE 610. In some aspects, the network node 605 or the UE 610 may determine that the UE has moved back into the area associated with the network node 605. The network node 605 may determine to accept, and the UE may determine to transmit, network coding requests based at least in part on the UE 610 moving back into the area associated with the network node 605.

In some aspects, the updated network coding information may be based at least in part on an update to one or more other network coding conditions. For example, the network node 605 may transmit an indication to the UE 610 indicating that the network node 605 will not perform network coding for communications from the UE 610 as a result of an increased network load. In another example, the network node may transmit an indication to the UE 610 indicating that the network node will perform (e.g., resume performing) network coding for communications from the UE 610 as a result of a decreased load of the network node 605. Thus, the network node 605 and the UE 610 may be configured to adapt to changing network conditions, and may update the network coding abilities accordingly.

As described above, enabling the network node 605 and the UE 610 to determine whether the network node 605 can accept network coding requests from the UE 610 may reduce network congestion. For example, the network node 605 may only be able to perform network coding for a number of communications at a time. This is particularly true when the network coding requests are for sidelink communications or retransmissions. Using the techniques and apparatuses described herein, the UE 610 may only transmit, and the network node 605 may only accept, requests for network coding when the UE 610 is within a location that is defined by an area of the network node 605. Thus, the number of network coding requests, and therefore, the number of resources (e.g., sidelink resources) of the network node 605 needed to perform the network coding, may be reduced.

As indicated above, FIG. 6 is provided as an example. Other examples may differ from what is described with respect to FIG. 6.

Figure 7:
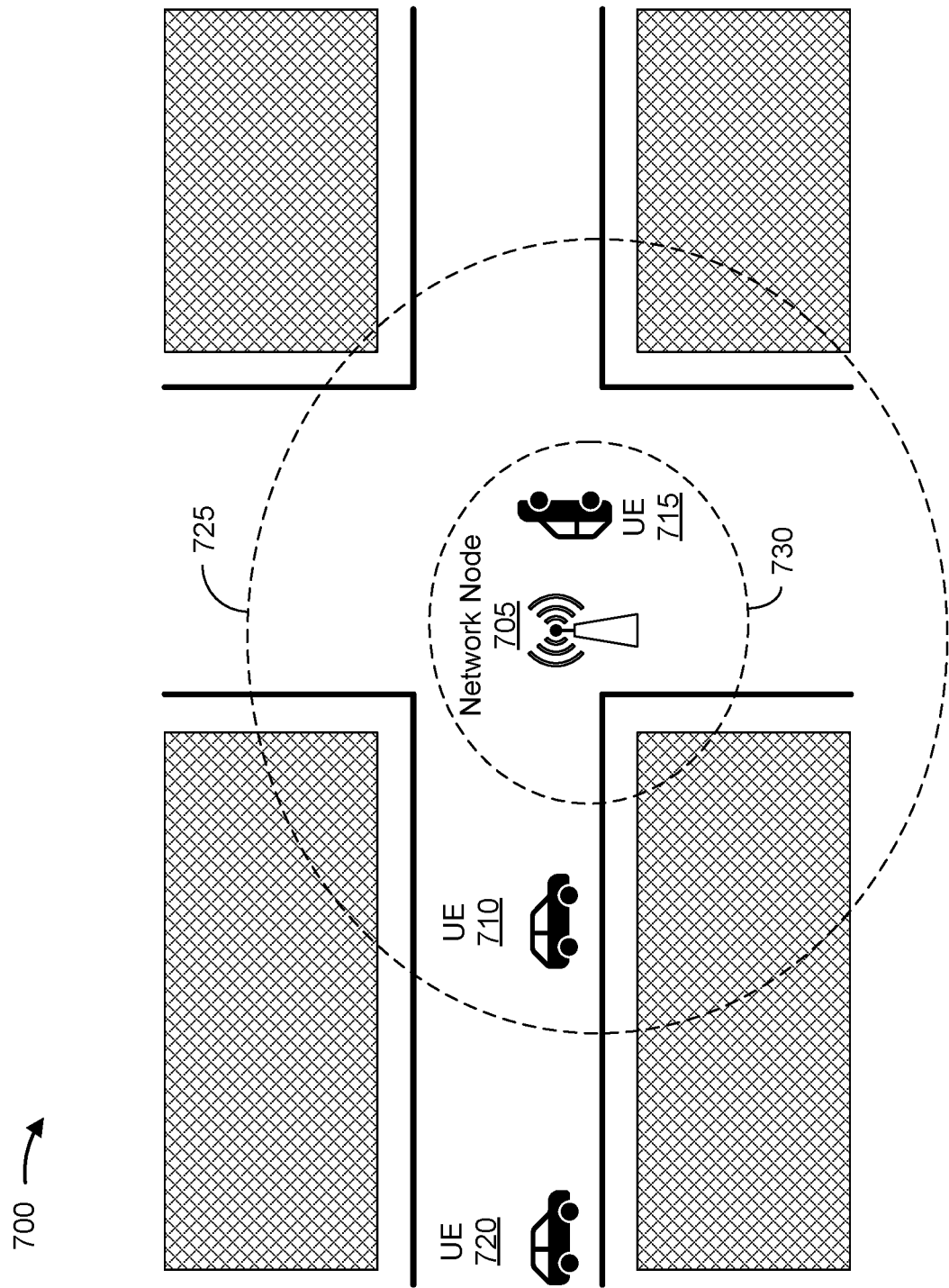
FIG. 7 is a diagram illustrating an example associated with an area of a network node, in accordance with the present disclosure.

FIG. 7 is a diagram illustrating an example 700 of an area associated with a network node. A network node, such as the network node 705, may communicate with a plurality of UEs, such as the UE 710, the UE 715, and the UE 720. The network node 705 may include some or all of the features of the network node 605. Each of the UEs 710, 715, and 720 may include some or all of the features of the UE 610. The network node 705 may be associated with an area, such as the area shown by one or more of the dashed lines 725 and 730. The network node 705 may be configured to accept network coding requests from UEs that are within the area associated with the network node, and may be configured to reject network coding requests from UEs that are outside of the area associated with the network node.

In some aspects, the area associated with the network node 705 may be an area that is defined by a maximum distance from the network node 705. For example, the area may correspond to the area indicated by the first dashed line 725. The network node 705 may be configured to accept network coding requests from a device that is less than the maximum distance away from the network node 705 (e.g., any device that is within the area indicated by the first dashed line 725). For example, the network node 705 may accept one or more network coding requests from the UE 710 and/or the UE 715. In contrast, the network node 705 may be configured to reject network coding requests from any device that is greater than the maximum distance away from the network node 705 (e.g., any device that is outside of the first dashed line 725). For example, the network node 705 may reject one or more network coding requests from the UE 720.

In some aspects, the area associated with the network node 705 may include an area with a first boundary defined by a minimum distance from the network node 705 and a second boundary defined by a maximum distance from the network node 705. For example, the area may be the area that is indicated between the first dashed line 725 (e.g., the first boundary) and the second dashed line 730 (e.g., the second boundary). The network node 705 may be configured to accept network coding requests from a device that is less than the maximum distance (e.g., indicated by the first dashed line 725), but greater than the minimum distance (e.g., indicated by the second dashed line 730), from the network node 705. For example, the network node 705 may accept a network coding request from the UE 710 since the UE 710 is greater than the minimum distance, but less than the maximum distance, from the network node 705. In contrast, the network node 705 may reject network coding requests from the UE 715 and/or the UE 720. For example, the network node 705 may reject a network coding request from the UE 715 since the UE 715 is less than the minimum distance away from the network node 705, and may reject a network coding request from the UE 720 since the UE 720 is greater than the maximum distance away from the network node 705.

As indicated above, FIG. 7 is provided as an example. Other examples may differ from what is described with respect to FIG. 7.

Figure 8:
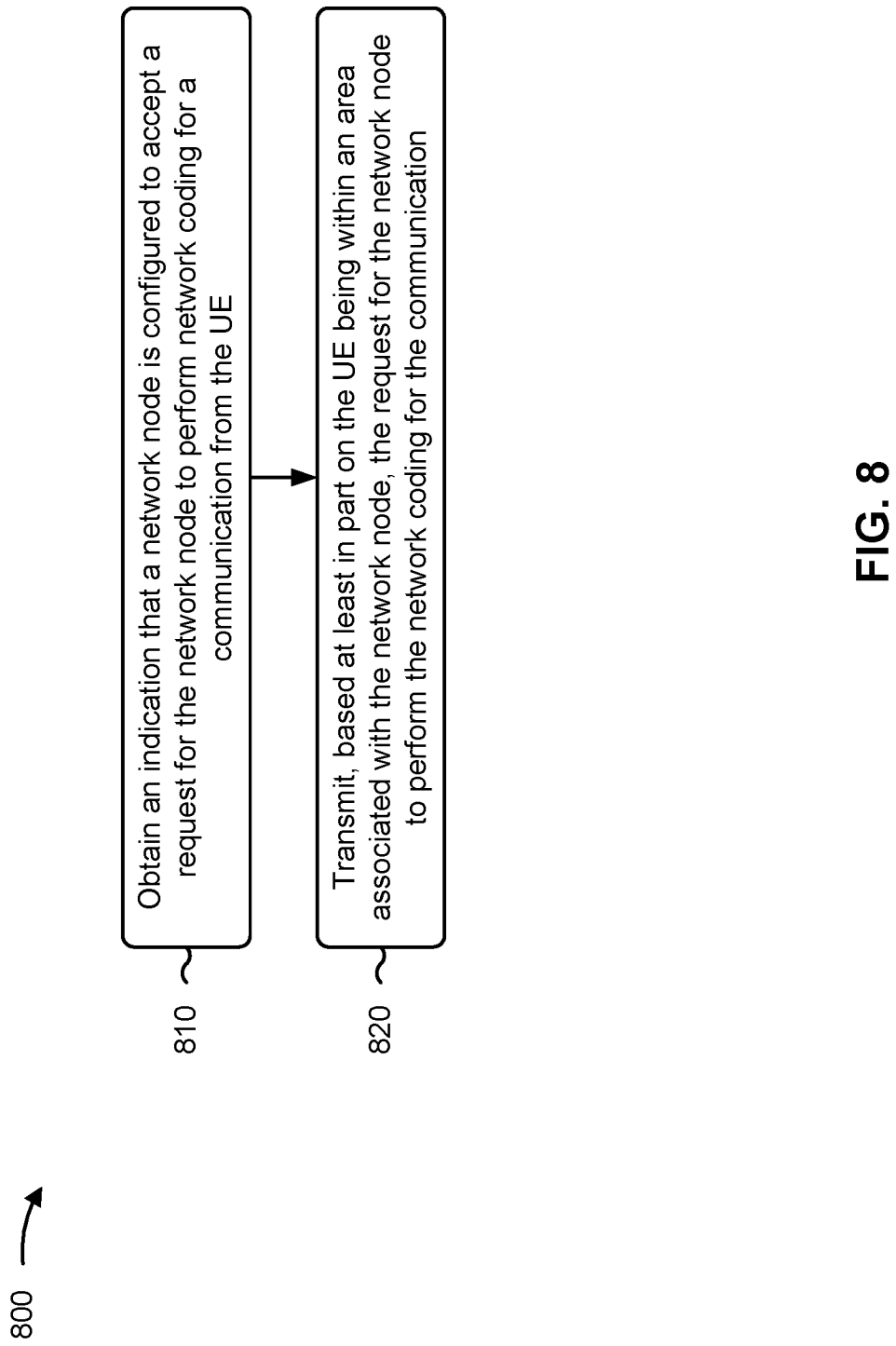
FIG. 8 is a diagram illustrating an example process associated with network coding initiation for sidelink, in accordance with the present disclosure.

FIG. 8 is a diagram illustrating an example process 800 performed, for example, by a UE, in accordance with the present disclosure. Example process 800 is an example where the UE (e.g., UE 120) performs operations associated with network coding initiation for sidelink.

As shown in FIG. 8, in some aspects, process 800 may include obtaining an indication that a network node is configured to accept a request for the network node to perform network coding for a communication from the UE (block 810). For example, the UE (e.g., using communication manager 140 and/or obtaining component 1008, depicted in FIG. 10) may obtain an indication that a network node is configured to accept a request for the network node to perform network coding for a communication from the UE, as described above.

As further shown in FIG. 8, in some aspects, process 800 may include transmitting, based at least in part on the UE being within an area associated with the network node, the request for the network node to perform the network coding for the communication (block 820). For example, the UE (e.g., using communication manager 140 and/or transmission component 1004, depicted in FIG. 10) may transmit, based at least in part on the UE being within an area associated with the network node, the request for the network node to perform the network coding for the communication, as described above.

Process 800 may include additional aspects, such as any single aspect or any combination of aspects described below and/or in connection with one or more other processes described elsewhere herein.

In a first aspect, process 800 includes receiving, from the network node and after transmitting the request, a network coding indication that indicates whether the network node will perform the network coding for the communication.

In a second aspect, alone or in combination with the first aspect, process 800 includes refraining from retransmitting the communication based at least in part on the network coding indication indicating that the network node will perform the network coding for the communication.

In a third aspect, alone or in combination with one or more of the first and second aspects, process 800 includes retransmitting the communication based at least in part on the network coding indication indicating that the network node will not perform the network coding for the communication.

In a fourth aspect, alone or in combination with one or more of the first through third aspects, the area associated with the network node comprises an area that is within a maximum distance from the network node.

In a fifth aspect, alone or in combination with one or more of the first through third aspects, the area associated with the network node comprises an area with a first boundary defined by a minimum distance from the network node and a second boundary defined by a maximum distance from the network node.

In a sixth aspect, alone or in combination with one or more of the first through fifth aspects, process 800 includes receiving, from the network node, an indication of the area associated with the network node.

In a seventh aspect, alone or in combination with one or more of the first through sixth aspects, the indication of the area associated with the network node is received from the network node using at least one of a sidelink communication, a medium access control message, or a radio resource control message.

In an eighth aspect, alone or in combination with one or more of the first through seventh aspects, process 800 includes determining that the UE is within the area associated with the network node prior to transmitting the request for the network node to perform the network coding for the communication.

In a ninth aspect, alone or in combination with one or more of the first through eighth aspects, process 800 includes determining that the UE has moved outside of the area associated with the network node, and performing retransmissions of one or more communications based at least in part on the UE being outside of the area associated with the network node.

In a tenth aspect, alone or in combination with one or more of the first through ninth aspects, the performance of the retransmissions of the one or more communications is enabled or disabled based at least in part on a configuration of the UE or an indication received from the network node.

In an eleventh aspect, alone or in combination with one or more of the first through tenth aspects, a maximum number of retransmissions of the one or more communications is based at least in part on a configuration of the UE or an indication received from the network node.

In a twelfth aspect, alone or in combination with one or more of the first through eleventh aspects, process 800 includes refraining from retransmitting the one or more communications based at least in part on determining that the maximum number of retransmissions by the UE has been performed.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
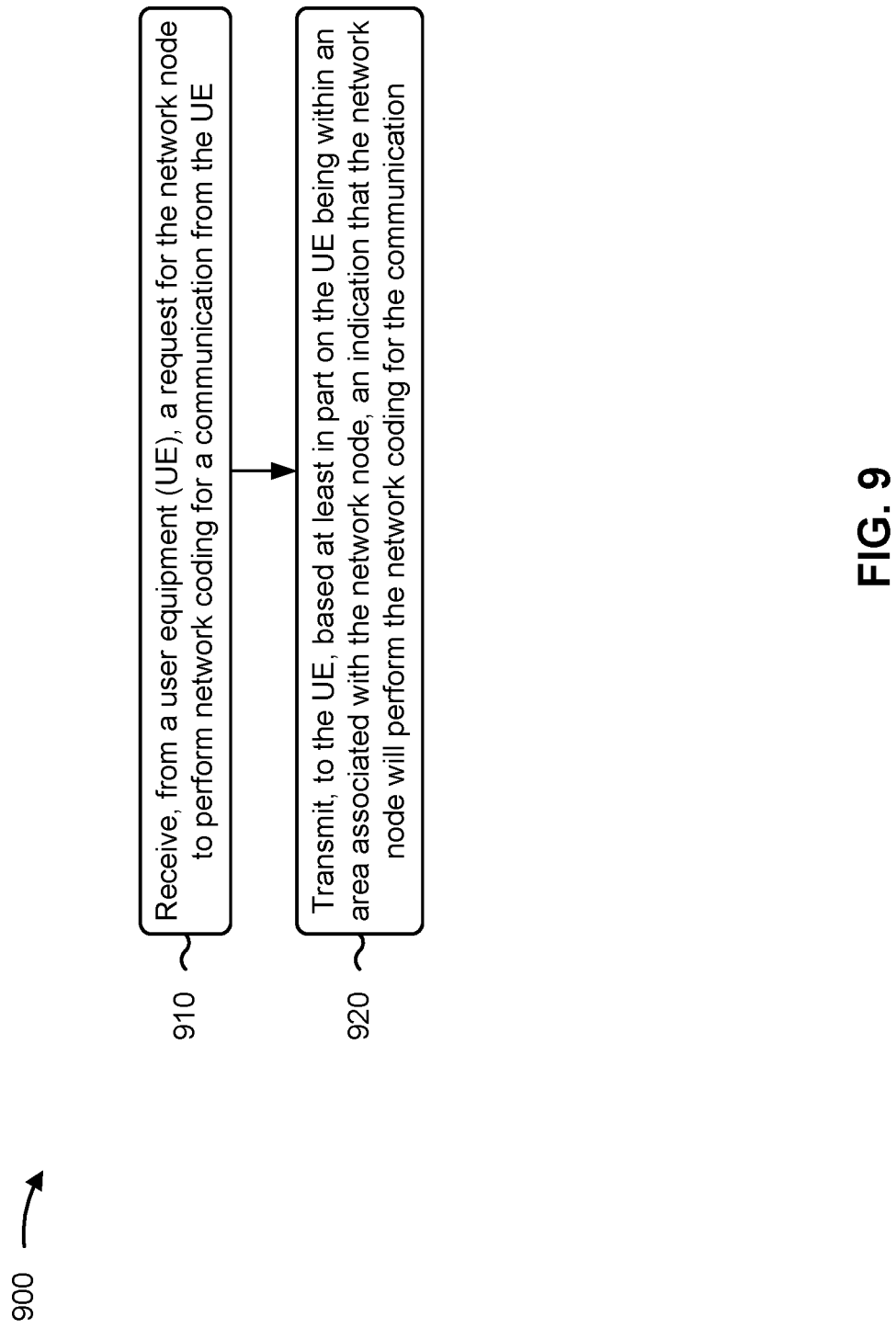
FIG. 9 is a diagram illustrating an example process associated with network coding initiation for sidelink, in accordance with the present disclosure.

FIG. 9 is a diagram illustrating an example process 900 performed, for example, by a network node, in accordance with the present disclosure. Example process 900 is an example where the network node performs operations associated with network coding initiation for sidelink.

As shown in FIG. 9, in some aspects, process 900 may include receiving, from a UE, a request for the network node to perform network coding for a communication from the UE (block 910). For example, the network node (e.g., using communication manager 150 and/or reception component 1102, depicted in FIG. 11) may receive, from a UE, a request for the network node to perform network coding for a communication from the UE, as described above.

As further shown in FIG. 9, in some aspects, process 900 may include transmitting, to the UE, based at least in part on the UE being within an area associated with the network node, an indication that the network node will perform the network coding for the communication (block 920). For example, the network node (e.g., using communication manager 150 and/or transmission component 1104, depicted in FIG. 11) may transmit, to the UE, based at least in part on the UE being within an area associated with the network node, an indication that the network node will perform the network coding for the communication, as described above.

Process 900 may include additional aspects, such as any single aspect or any combination of aspects described below and/or in connection with one or more other processes described elsewhere herein.

In a first aspect, process 900 includes performing the network coding for the communication based at least in part on the UE being within the area associated with the network node.

In a second aspect, alone or in combination with the first aspect, process 900 includes determining whether to accept the request to perform the network coding for the communication based at least in part on at least one of a location of the network node, a location of the UE, a priority of the communication, a current load of a network associated with the network node, or a current load of the network node.

In a third aspect, alone or in combination with one or more of the first and second aspects, process 900 includes determining that the UE is within the area associated with the network node, prior to transmitting the indication that the network node will perform the network coding for the communication.

In a fourth aspect, alone or in combination with one or more of the first through third aspects, process 900 includes determining that the UE has moved outside of the area associated with the network node, and transmitting, to the UE, an indication that the network node will not perform network coding for communications from the UE.

In a fifth aspect, alone or in combination with one or more of the first through fourth aspects, the area associated with the network node comprises an area that is within a maximum distance from the network node.

In a sixth aspect, alone or in combination with one or more of the first through fourth aspects, the area associated with the network node comprises an area with a first boundary defined by a minimum distance from the network node and a second boundary defined by a maximum distance from the network node.

In a seventh aspect, alone or in combination with one or more of the first through sixth aspects, process 900 includes transmitting, to the UE, an indication of the area associated with the network node using at least one of a sidelink communication, a medium access control message, or a radio resource control message.

In an eighth aspect, alone or in combination with one or more of the first through seventh aspects, process 900 includes transmitting, to the UE, a number of retransmissions of the communication permitted by the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
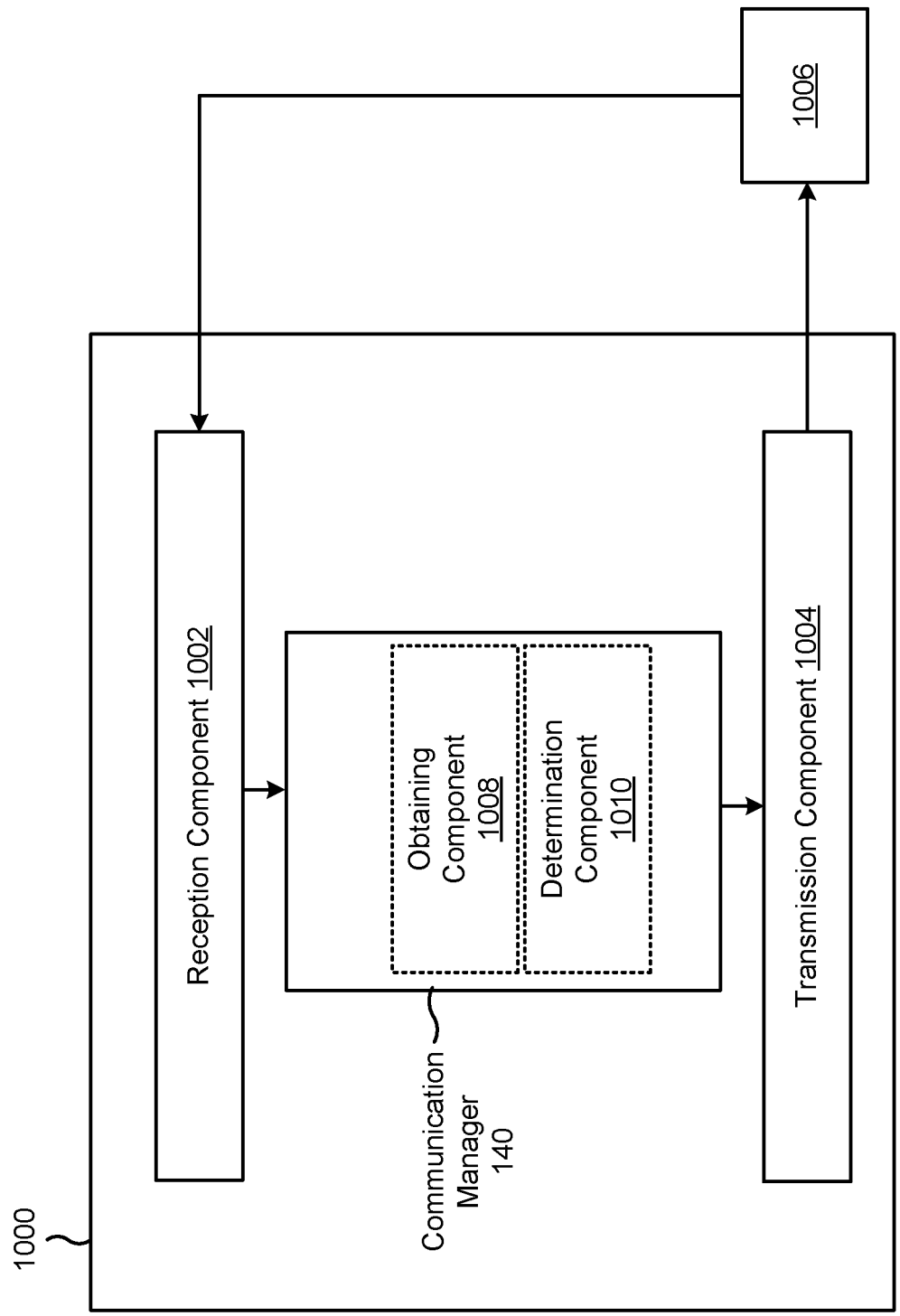
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an obtaining component 1008 or a determination component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The obtaining component 1008 may obtain an indication that a network node is configured to accept a request for the network node to perform network coding for a communication from the UE. The transmission component 1004 may transmit, based at least in part on the UE being within an area associated with the network node, the request for the network node to perform the network coding for the communication.

The reception component 1008 may receive, from the network node and after transmitting the request, a network coding indication that indicates whether the network node will perform the network coding for the communication.

The transmission component 1004 may refrain from retransmitting the communication based at least in part on the network coding indication indicating that the network node will perform the network coding for the communication.

The transmission component 1004 may retransmit the communication based at least in part on the network coding indication indicating that the network node will not perform the network coding for the communication.

The reception component 1002 may receive, from the network node, an indication of the area associated with the network node.

The determination component 1010 may determine that the UE is within the area associated with the network node prior to transmitting the request for the network node to perform the network coding for the communication.

The determination component 1010 may determine that the UE has moved outside of the area associated with the network node.

The transmission component 1004 may perform retransmissions of one or more communications based at least in part on the UE being outside of the area associated with the network node.

The transmission component 1004 may refrain from retransmitting the one or more communications based at least in part on determining that the maximum number of retransmissions by the UE has been performed.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
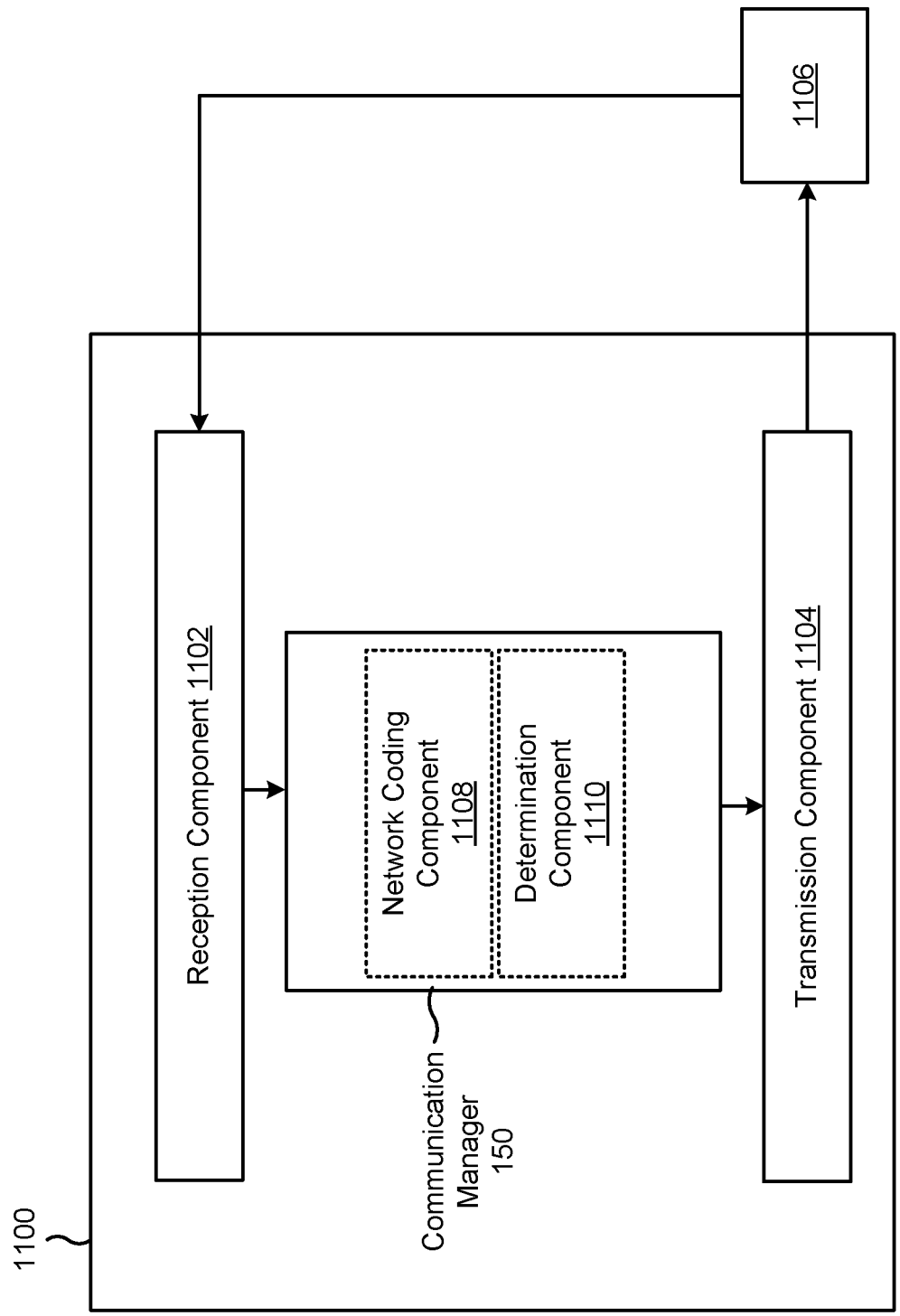
FIG. 11 is a diagram of an example apparatus for wireless communication, in accordance with the present disclosure.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a network coding component 1108 or a determination component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a UE, a request for the network node to perform network coding for a communication from the UE. The transmission component 1104 may transmit, to the UE, based at least in part on the UE being within an area associated with the network node, an indication that the network node will perform the network coding for the communication.

The network coding component 1108 may perform the network coding for the communication based at least in part on the UE being within the area associated with the network node.

The determination component 1110 may determine whether to accept the request to perform the network coding for the communication based at least in part on at least one of a location of the network node, a location of the UE, a priority of the communication, a current load of a network associated with the network node, or a current load of the network node.

The determination component 1110 may determine that the UE is within the area associated with the network node prior to the transmission of the indication that the network node will perform the network coding for the communication.

The determination component 1110 may determine that the UE has moved outside of the area associated with the network node.

The transmission component 1104 may transmit, to the UE, an indication that the network node will not perform network coding for communications from the UE.

The transmission component 1104 may transmit, to the UE, an indication of the area associated with the network node using at least one of a sidelink communication, a medium access control message, or a radio resource control message.

The transmission component 1104 may transmit, to the UE, a number of retransmissions of the communication permitted by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: obtaining an indication that a network node is configured to accept a request for the network node to perform network coding for a communication from the UE; and transmitting, based at least in part on the UE being within an area associated with the network node, the request for the network node to perform the network coding for the communication.

Aspect 2: The method of Aspect 1, further comprising receiving, from the network node and after transmitting the request, a network coding indication that indicates whether the network node will perform the network coding for the communication.

Aspect 3: The method of Aspect 2, further comprising refraining from retransmitting the communication based at least in part on the network coding indication indicating that the network node will perform the network coding for the communication.

Aspect 4: The method of Aspect 2, further comprising retransmitting the communication based at least in part on the network coding indication indicating that the network node will not perform the network coding for the communication.

Aspect 5: The method of any of Aspects 1-4, wherein the area associated with the network node comprises an area that is within a maximum distance from the network node.

Aspect 6: The method of any of Aspects 1-4, wherein the area associated with the network node comprises an area with a first boundary defined by a minimum distance from the network node and a second boundary defined by a maximum distance from the network node.

Aspect 7: The method of any of Aspects 1-6, further comprising receiving, from the network node, an indication of the area associated with the network node.

Aspect 8: The method of Aspect 7, wherein the indication of the area associated with the network node is received from the network node using at least one of a sidelink communication, a medium access control message, or a radio resource control message.

Aspect 9: The method of any of Aspects 1-8, further comprising determining that the UE is within the area associated with the network node prior to transmitting the request for the network node to perform the network coding for the communication.

Aspect 10: The method of any of Aspects 1-9, further comprising: determining that the UE has moved outside of the area associated with the network node; and performing retransmissions of one or more communications based at least in part on the UE being outside of the area associated with the network node.

Aspect 11: The method of Aspect 10, wherein the performance of the retransmissions of the one or more communications is enabled or disabled based at least in part on a configuration of the UE or an indication received from the network node.

Aspect 12: The method of Aspect 10, wherein a maximum number of retransmissions of the one or more communications is based at least in part on a configuration of the UE or an indication received from the network node.

Aspect 13: The method of Aspect 12, further comprising refraining from retransmitting the one or more communications based at least in part on determining that the maximum number of retransmissions by the UE has been performed.

Aspect 14: A method of wireless communication performed by a network node, comprising: receiving, from a user equipment (UE), a request for the network node to perform network coding for a communication from the UE; and transmitting, to the UE, based at least in part on the UE being within an area associated with the network node, an indication that the network node will perform the network coding for the communication.

Aspect 15: The method of Aspect 14, further comprising performing the network coding for the communication based at least in part on the UE being within the area associated with the network node.

Aspect 16: The method of any of Aspects 14-15, further comprising determining whether to accept the request to perform the network coding for the communication based at least in part on at least one of a location of the network node, a location of the UE, a priority of the communication, a current load of a network associated with the network node, or a current load of the network node.

Aspect 17: The method of any of Aspects 14-16, further comprising determining that the UE is within the area associated with the network node prior to transmitting the indication that the network node will perform the network coding for the communication.

Aspect 18: The method of any of Aspects 14-17, further comprising: determining that the UE has moved outside of the area associated with the network node; and transmitting, to the UE, an indication that the network node will not perform network coding for communications from the UE.

Aspect 19: The method of any of Aspects 14-18, wherein the area associated with the network node comprises an area that is within a maximum distance from the network node.

Aspect 20: The method of any of Aspects 14-18, wherein the area associated with the network node comprises an area with a first boundary defined by a minimum distance from the network node and a second boundary defined by a maximum distance from the network node.

Aspect 21: The method of any of Aspects 14-20, further comprising transmitting, to the UE, an indication of the area associated with the network node using at least one of a sidelink communication, a medium access control message, or a radio resource control message.

Aspect 22: The method of any of Aspects 14-21, further comprising transmitting, to the UE, a number of retransmissions of the communication permitted by the UE.

Aspect 23: An apparatus for wireless communication at a device, comprising a processor; memory coupled with the processor; and instructions stored in the memory and executable by the processor to cause the apparatus to perform the method of one or more of Aspects 1-13.

Aspect 24: A device for wireless communication, comprising a memory and one or more processors coupled to the memory, the one or more processors configured to perform the method of one or more of Aspects 1-13.

Aspect 25: An apparatus for wireless communication, comprising at least one means for performing the method of one or more of Aspects 1-13.

Aspect 26: A non-transitory computer-readable medium storing code for wireless communication, the code comprising instructions executable by a processor to perform the method of one or more of Aspects 1-13.

Aspect 27: A non-transitory computer-readable medium storing a set of instructions for wireless communication, the set of instructions comprising one or more instructions that, when executed by one or more processors of a device, cause the device to perform the method of one or more of Aspects 1-13.

Aspect 28: An apparatus for wireless communication at a device, comprising a processor; memory coupled with the processor; and instructions stored in the memory and executable by the processor to cause the apparatus to perform the method of one or more of Aspects 14-22.

Aspect 29: A device for wireless communication, comprising a memory and one or more processors coupled to the memory, the one or more processors configured to perform the method of one or more of Aspects 14-22.

Aspect 30: An apparatus for wireless communication, comprising at least one means for performing the method of one or more of Aspects 14-22.

Aspect 31: A non-transitory computer-readable medium storing code for wireless communication, the code comprising instructions executable by a processor to perform the method of one or more of Aspects 14-22.

Aspect 32: A non-transitory computer-readable medium storing a set of instructions for wireless communication, the set of instructions comprising one or more instructions that, when executed by one or more processors of a device, cause the device to perform the method of one or more of Aspects 14-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   obtaining an indication that a network node is configured to accept a request for the network node to perform network coding for a communication from the UE, wherein a network coded communication comprises two or more communications that are combined using encoding; and
   transmitting, based at least in part on the UE being within a coverage area associated with—the network node, the request for the network node to perform the network coding for the communication.

2. The method of claim 1, further comprising receiving, from the network node and after transmitting the request, a network coding indication that indicates whether the network node will perform the network coding for the communication.

3. The method of claim 2, further comprising refraining from retransmitting the communication based at least in part on the network coding indication indicating that the network node will perform the network coding for the communication.

4. The method of claim 2, further comprising retransmitting the communication based at least in part on the network coding indication indicating that the network node will not perform the network coding for the communication.

5. The method of claim 1, wherein the coverage area associated with the network node comprises an area that is within a maximum distance from the network node.

6. The method of claim 1, wherein the coverage area associated with the network node comprises an area with a first boundary defined by a minimum distance from the network node and a second boundary defined by a maximum distance from the network node.

7. The method of claim 1, further comprising receiving, from the network node, an indication of the coverage area associated with the network node.

8. The method of claim 7, wherein the indication of the coverage area associated with the network node is received from the network node via at least one of a sidelink communication, a medium access control message, or a radio resource control message.

9. The method of claim 1, further comprising determining that the UE is within the coverage area associated with the network node prior to transmitting the request for the network node to perform the network coding for the communication.

10. The method of claim 1, further comprising:
    determining that the UE has moved outside of the coverage area associated with the network node; and
    performing retransmissions of one or more communications based at least in part on the UE being outside of the coverage area associated with the network node.

11. The method of claim 10, wherein the performing of the retransmissions of the one or more communications is enabled or disabled based at least in part on a configuration of the UE or an indication received from the network node.

12. The method of claim 10, wherein a maximum number of retransmissions of the one or more communications is based at least in part on a configuration of the UE or an indication received from the network node.

13. The method of claim 12, further comprising refraining from retransmitting the one or more communications based at least in part on determining that the maximum number of retransmissions by the UE has been performed.

14. A method of wireless communication performed by a network node, comprising:
    receiving, from a user equipment (UE), a request for the network node to perform network coding for a communication from the UE, the network coding comprising encoding the communication and another communication to combine the communication and the other communication; and transmitting, to the UE, based at least in part on the UE being within a coverage area associated with the network node, an indication that the network node will perform the network coding for the communication.

15. The method of claim 14, further comprising performing the network coding for the communication based at least in part on the UE being within the coverage area associated with the network node.

16. The method of claim 14, further comprising determining whether to accept the request to perform the network coding for the communication based at least in part on at least one of a location of the network node, a location of the UE, a priority of the communication, a current load of a network associated with the network node, or a current load of the network node.

17. The method of claim 14, further comprising determining that the UE is within the coverage area associated with the network node prior to transmitting the indication that the network node will perform the network coding for the communication.

18. The method of claim 14, further comprising:
determining that the UE has moved outside of the coverage area associated with the network node; and
transmitting, to the UE, an indication that the network node will not perform network coding for communications from the UE.

19. The method of claim 14, wherein the coverage area associated with the network node comprises an area that is within a maximum distance from the network node.

20. The method of claim 14, wherein the coverage area associated with the network node comprises an area with a first boundary defined by a minimum distance from the network node and a second boundary defined by a maximum distance from the network node.

21. The method of claim 14, further comprising transmitting, to the UE, an indication of the coverage area associated with the network node using at least one of a sidelink communication, a medium access control message, or a radio resource control message.

22. The method of claim 14, further comprising transmitting, to the UE, a number of retransmissions of the communication permitted by the UE.

23. An apparatus for wireless communication at a user equipment (UE), comprising:
one or more memories; and
one or more processors, coupled to the one or more memories, configured to:
obtain an indication that a network node is configured to accept a request for the network node to perform network coding for a communication from the UE, wherein a network coded communication comprises two or more communications that are combined using encoding; and
transmit, based at least in part on the UE being within a coverage area associated with—the network node, the request for the network node to perform the network coding for the communication.

24. The apparatus of claim 23, wherein the one or more processors are further configured to receive, from the network node and after transmitting the request, a network coding indication that indicates whether the network node will perform the network coding for the communication.

25. The apparatus of claim 24, wherein the one or more processors are further configured to refrain from retransmitting the communication based at least in part on the network coding indication indicating that the network node will perform the network coding for the communication.

26. The apparatus of claim 24, wherein the one or more processors are further configured to retransmit the communication based at least in part on the network coding indication indicating that the network node will not perform the network coding for the communication.

27. The apparatus of claim 23, wherein the one or more processors are further configured to determine that the UE is within the coverage area associated with the network node prior to transmitting the request for the network node to perform the network coding for the communication.

28. The apparatus of claim 23, wherein the one or more processors are further configured to:
determine that the UE has moved outside of the coverage area associated with the network node; and
perform retransmissions of one or more communications based at least in part on the UE being outside of the coverage area associated with the network node.

29. An apparatus for wireless communication at a network node, comprising:
a one or more memories; and
one or more processors, coupled to the one or more memories, configured to:
receive, from a user equipment (UE), a request for the network node to perform network coding for a communication from the UE, the network coding comprising encoding the communication and another communication to combine the communication and the other communication; and
transmit, to the UE, based at least in part on the UE being within a coverage area associated with the network node, an indication that the network node will perform the network coding for the communication.

30. The apparatus of claim 29, wherein the one or more processors are further configured to perform the network coding for the communication based at least in part on the UE being within the coverage area associated with the network node.

* * * * *